(12) United States Patent
Wilson (10) Patent No.: US 7,226,265 B2
(45) Date of Patent: Jun. 5, 2007

(54) TIRE-DETECTING WHEEL CHOCK APPARATUS

(75) Inventor: James D. Wilson, Alliance, OH (US)

(73) Assignee: Hendrickson USA, L L.C., Itasca, IL (US)

( * ) Notice: Subject to any disclaimer, the term of this patent is extended or adjusted under 35 U.S.C. 154(b) by 0 days.

(21) Appl. No.: 10/798,708

(22) Filed: Mar. 11, 2004

(65) Prior Publication Data

US 2005/0226705 A1    Oct. 13, 2005

(51) Int. Cl.
*B65G 67/00*  (2006.01)
(52) U.S. Cl. .................... 414/401; 340/436
(58) Field of Classification Search ........... 340/436
See application file for complete search history.

(56) References Cited

U.S. PATENT DOCUMENTS

| | | | |
|---|---|---|---|
| 3,824,536 A * | 7/1974 | Cherico ................. 340/436 |
| 4,122,629 A * | 10/1978 | Rennick ................. 49/357 |
| 4,830,563 A * | 5/1989 | Yeakle ................. 414/401 |
| 5,457,838 A * | 10/1995 | Gelder et al. ........... 14/69.5 |
| 5,582,498 A * | 12/1996 | Springer et al. ......... 414/401 |
| 6,033,174 A * | 3/2000 | Alexander ............ 414/401 |
| 6,222,457 B1 * | 4/2001 | Mills et al. .......... 340/686.1 |
| 6,276,496 B1 * | 8/2001 | Hageman et al. ....... 414/401 |
| 6,336,527 B1 * | 1/2002 | Metz ................. 188/32 |
| 6,431,819 B1 * | 8/2002 | Hahn ................. 414/809 |
| 6,488,464 B1 * | 12/2002 | Kish ................. 414/401 |
| 6,505,713 B1 * | 1/2003 | Paul et al. ............ 188/36 |
| 6,526,615 B1 * | 3/2003 | Hutton et al. ........... 14/71.5 |
| 6,781,516 B2 * | 8/2004 | Reynard et al. ....... 340/686.1 |
| 6,805,471 B2 * | 10/2004 | Strelnieks ............ 362/407 |
| 6,817,879 B2 * | 11/2004 | Mulvenna et al. ...... 439/310 |
| 7,032,720 B2 * | 4/2006 | Jette et al. ............ 188/36 |
| 2004/0056763 A1 * | 3/2004 | Fischer et al. ........ 340/426.1 |

* cited by examiner

*Primary Examiner*—Thomas J. Brahan
(74) *Attorney, Agent, or Firm*—Buckingham, Doolittle & Burroughs, LLP.; David P. Dureska; Brent L. Moore (57) ABSTRACT

A wheel chock apparatus includes a chock body for chocking a tire of a vehicle such as a semi-trailer prior to loading or unloading the trailer by a towmotor at a docking bay. When properly positioned, the chock body prevents movement of the vehicle away from the docking bay during the loading or unloading operation. Such movement poses a possible hazard to the cargo being loaded or unloaded, to the equipment performing the loading/unloading operations, and to the operator of such equipment. The chock body includes a sensor mounted on or embedded in the body, which is capable of detecting a properly chocked tire. The sensor is electrically connected to a microcontroller programmed to control an indicator, such as a visual light or audible alarm, that will alert an equipment operator on the docking bay as to whether the driver of the vehicle has properly chocked the tires.

8 Claims, 6 Drawing Sheets

FIG-4

TIRE-DETECTING WHEEL CHOCK APPARATUS

BACKGROUND OF THE INVENTION

1. Field of the Invention

The invention relates to vehicles that can be loaded and unloaded using a towmotor, and specifically to wheel chocks used to prevent movement of the vehicle during the loading and unloading operations. More particularly, the invention is directed to a wheel chock apparatus capable of detecting the presence of a tire and indicating to an individual performing a loading or unloading operation whether the trailer is properly chocked.

2. Background Art

Heavy-duty vehicles such as semi-trailers or tractor-trailers typically include a trailer, which can be one of various types that are well-known in the heavy-duty vehicle art, and include van trailers and flatbed trailers. The trailers are used to haul cargo that typically is loaded onto and unloaded from the trailer at a loading dock or docking bay. Such heavy-duty vehicles also include box trucks, which do not have a separate trailer, but nonetheless have a large cargo compartment similar to a van trailer. The loading and unloading operations typically are carried out by an individual operating a forklift or towmotor which is able to lift pallets of cargo and load them onto or unload them from the trailer or cargo compartment. Hereinafter, and unless otherwise specified, when the term "trailer" is used, it will be understood that for ease of description the term also will include the cargo compartments of box trucks.

When a heavy towmotor drives onto a trailer floor or bed and, despite the fact that the vehicle parking or emergency brake may be engaged, a phenomenon called "trailer walk" or other trailer movement can occur. Many heavy-duty vehicles have trailing arm air-ride axle/suspension systems which depend from the vehicle frame and suspend wheels and tires from the trailer to provide a smooth ride to any cargo being carried by the trailer, as well as to occupants of the tractor or vehicle cab. However, the geometry of such air-ride axle/suspension systems can cause the trailer wheels and tires to rotate in a forward direction or away from the loading dock during a loading or unloading operation. This well-known phenomenon thus can create an undesirable and potentially dangerous gap between the rearwardmost edge of a trailer floor and the edge of a loading dock. Other movement of the trailer away from the loading dock, besides classic trailer walk, also can occur. More specifically, on vehicles having trailing or leading arm air-ride or leaf spring axle/suspension systems, and depending on the speed, direction, etc., at which a towmotor enters or exits the trailer, the force of the turning towmotor wheels themselves actually can also force a trailer away from a loading dock, thereby creating an undesirable gap between the trailer floor and docking bay edge.

Thus, as a towmotor repeatedly drives onto and off of a trailer bed to unload or load a trailer, the trailer can have a tendency to "walk" or otherwise move away from the loading dock. Eventually, such walk or other movement can cause the towmotor tires to become stuck between or even fall into the gap created between the trailer bed and the loading dock, which can damage the cargo being loaded/unloaded and/or the towmotor, and possibly even cause injury to the towmotor operator.

As a result of the trailer walk phenomenon and other potential trailer movement, it has been standard practice for many years at loading docks for the driver of a heavy-duty vehicle to chock one or more of the wheels, and typically the two rearwardmost wheels of the trailer, to prevent trailer walk or other movement. Specifically, the chocks typically are wedged in front of the rear tires to block forward motion of the trailer.

However, a towmotor operator typically cannot quickly visually verify that the wheel chocks are correctly wedged against the tires and the surface on which those tires rest, but instead must rely on and trust that the driver has satisfactorily accomplished this task. Unfortunately, a driver occasionally either will forget to position the wheel chocks altogether or position them improperly, so that unbeknownst to the towmotor operator, trailer walk or other trailer movement is occurring, creating a potentially inconvenient or unsafe situation for property and person.

Thus, a long-felt need has existed for an apparatus and/or process of ensuring proper positioning of wheel chocks, and also of indicating to a towmotor operator that the wheel chocks are correctly positioned.

The present invention solves the above-described problems of an unused or improperly positioned wheel chock, by modifying a usual wheel chock with a tire-sensing device that not only detects the proximity of the tire to the chock, thus ensuring that the wheel chock is correctly positioned against the tire, but also indicates to a towmotor operator that the chocks are correctly positioned.

SUMMARY OF THE INVENTION

Objectives of the present invention include providing a wheel chock capable of ensuring and indicating correct positioning of the chock against a vehicle tire mounted on the wheel.

Another objective of the present invention includes providing such a wheel chock which is economical, durable and easy to use and maintain.

These objectives and advantages are obtained by the tire-detecting wheel chock apparatus of the present invention, the general nature which may be stated as being useful at a docking bay for loading and unloading a heavy-duty vehicle, and including an apparatus for chocking at least one tire of the vehicle to prevent motion of the vehicle away from the docking bay during the loading/unloading, the apparatus further including chock means for wedging between the tire and a surface on which the tire is resting, to block motion of the tire and a wheel on which the tire is mounted away from the docking bay, sensor means mounted on the chock means for detecting a predetermined selected component of the vehicle, a programmable microcontroller, the microcontroller being electrically connected to the sensor, and indicator means electrically connected to the microcontroller for indicating a condition selected from the group consisting of, a properly positioned chock means and an improperly positioned chock means, so that at least an individual performing the loading and unloading is alerted to the condition.

BRIEF DESCRIPTION OF THE DRAWINGS

The preferred embodiments of the present invention, illustrative of the best modes in which applicant has contemplated applying the principles, are set forth in the following description and is shown in the drawings, and are particularly and distinctly pointed out and set forth in the appended claims.

Similar numerals refer to similar parts throughout the drawings.

DESCRIPTION OF THE PREFERRED EMBODIMENT

Heavy-duty combination tractor-trailers, also known as semi-trailers, typically have a cab or tractor (not shown) which holds the driver of the vehicle and any passengers and pulls the trailer. The pulled trailer can be one of various types, such as van trailers which generally are rectangular-shaped box-like structures that are commonly seen traveling over-the-road. Another common trailer is the flatbed-type which generally only has a floor for carrying cargo, but the cargo typically is not fully enclosed as in the van-type trailer, although a flatbed trailer can have sidewalls and/or tarp covers, if desired. Various other types of trailers and other heavy-duty vehicles such as box trucks having cargo compartments also exist, but one common denominator in all such trailers and other vehicles having cargo compartments is that they have a floor. Hereinafter, and unless otherwise specified, when the term "trailer" is used, it will be understood that for ease of description the term will include the cargo compartments of box trucks.

Typically attached to and suspended from the bottom of the trailer floor are one or more axle/suspension systems to which the wheels and tires of the trailer are attached. The purpose of the axle/suspension system is not only to mount the wheels and tires, but also to provide a soft ride to the driver and any passengers or cargo being carried by the vehicle. However, due to the geometry of the design of most trailing arm air-ride axle/suspension systems, when such a trailer is backed up to a loading dock or docking bay and a forklift or towmotor pulls onto the floor of the trailer for loading or unloading cargo, the weight of the towmotor and any load of cargo that it is carrying onto the trailer can cause the trailer tires/wheels to rotate and to move forward or "walk" away from the loading dock. Such trailer walk, which is well-known to those skilled in the heavy-duty vehicle art, can create a gap between the rearwardmost end of the trailer floor and the docking bay, thus causing a potentially unsafe situation for the towmotor operator should the towmotor wheels become stuck in or fall into the gap. Such a situation also could cause damage to the towmotor and/or any cargo it is loading or unloading. Other movement of the trailer away from the loading dock, besides classic trailer walk, also can occur. More specifically, on vehicles having trailing or leading arm air-ride or leaf spring axle/suspension systems, and depending on the speed, direction, etc., at which a towmotor enters or exits the trailer, the force of the turning towmotor wheels themselves actually can also force a trailer away from a loading dock, thereby creating an undesirable gap between the trailer floor and loading dock edge.

To remedy the trailer movement problem, for many years chocks of various designs and materials have been used as a wedge or block between a lower front portion of the rear tires and the surface on which the trailer tires are resting, to prevent forward movement of the trailer away from the dock. However, the responsibility of chocking the trailer typically rests with the driver of the vehicle, and if he or she forgets to utilize the chocks or improperly positions the chocks, trailer walk or other motion still can occur. The towmotor operator must place his trust in the driver to properly chock the tires and has no quick way of knowing whether the chocks have been properly positioned or even used at all, short of stopping his/her loading or unloading task, climbing off of the towmotor and loading dock, and visually checking the rear tires.

Figure 1A:
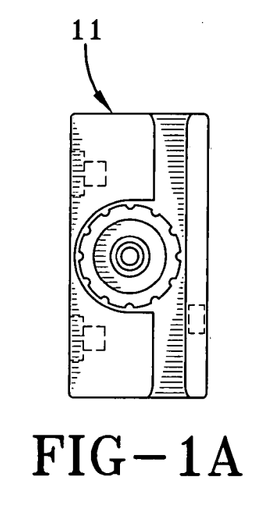
FIG. 1A is a top end view, with hidden portions shown in phantom lines, of a sensor of the type useful in the tire-detecting wheel chock apparatus of the present invention.
Figure 1B:
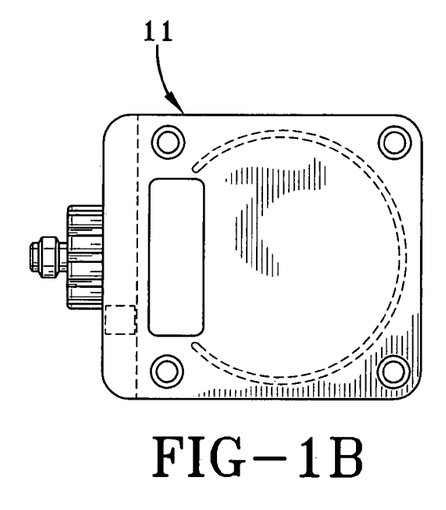
FIG. 1B is a front view, with hidden portions illustrated in phantom lines, of the sensor of FIG. 1A.
Figure 1C:
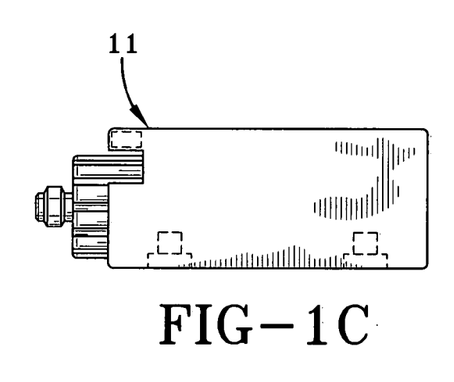
FIG. 1C is a side view, with hidden portions represented by phantom lines, of the sensor shown in FIGS. 1A and 1B.
Figure 2:
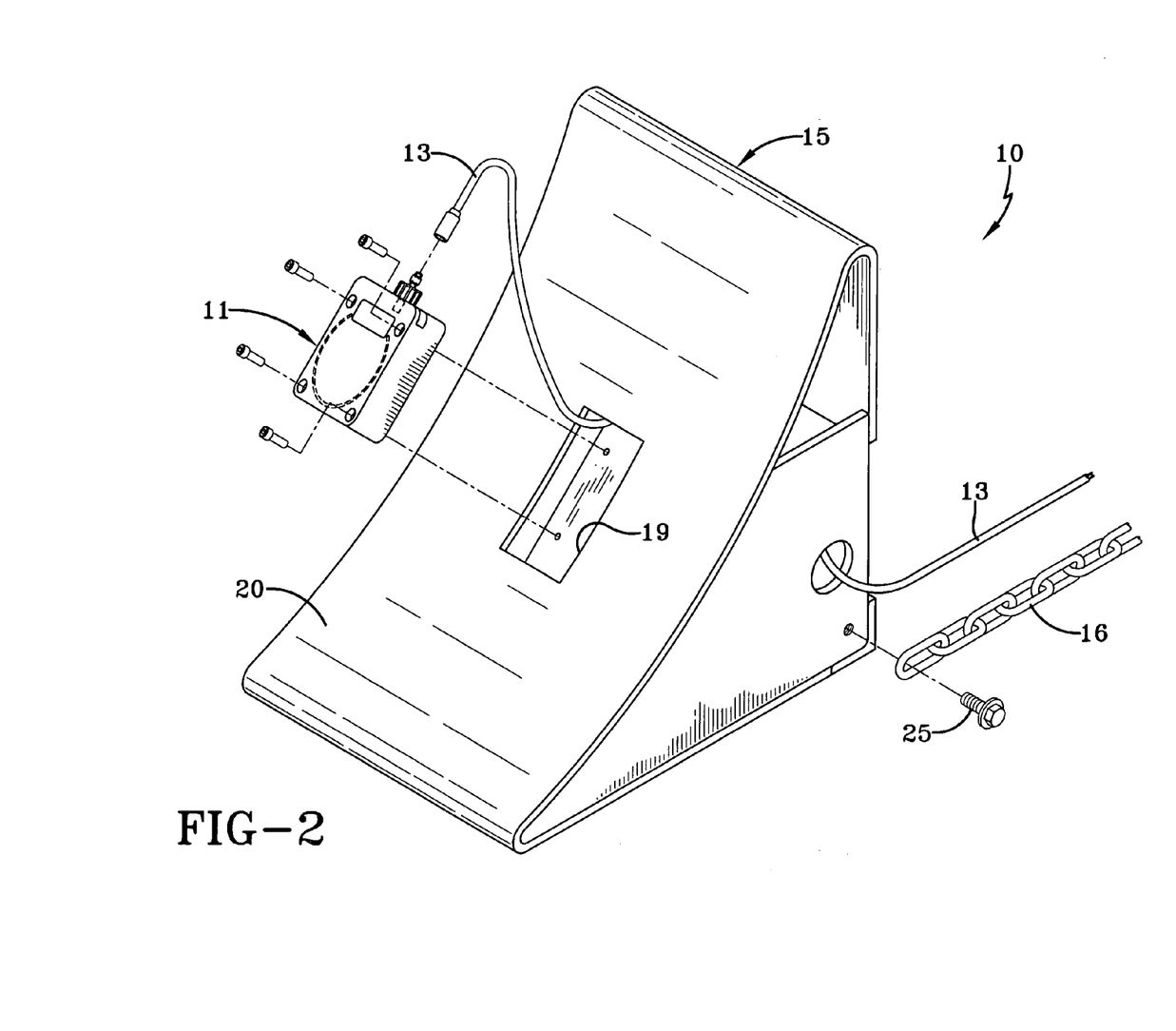
FIG. 2 is a fragmentary exploded perspective view, with hidden portions shown in phantom lines, of a first embodiment of the tire-detecting wheel chock apparatus of the present invention.
Figure 2A:
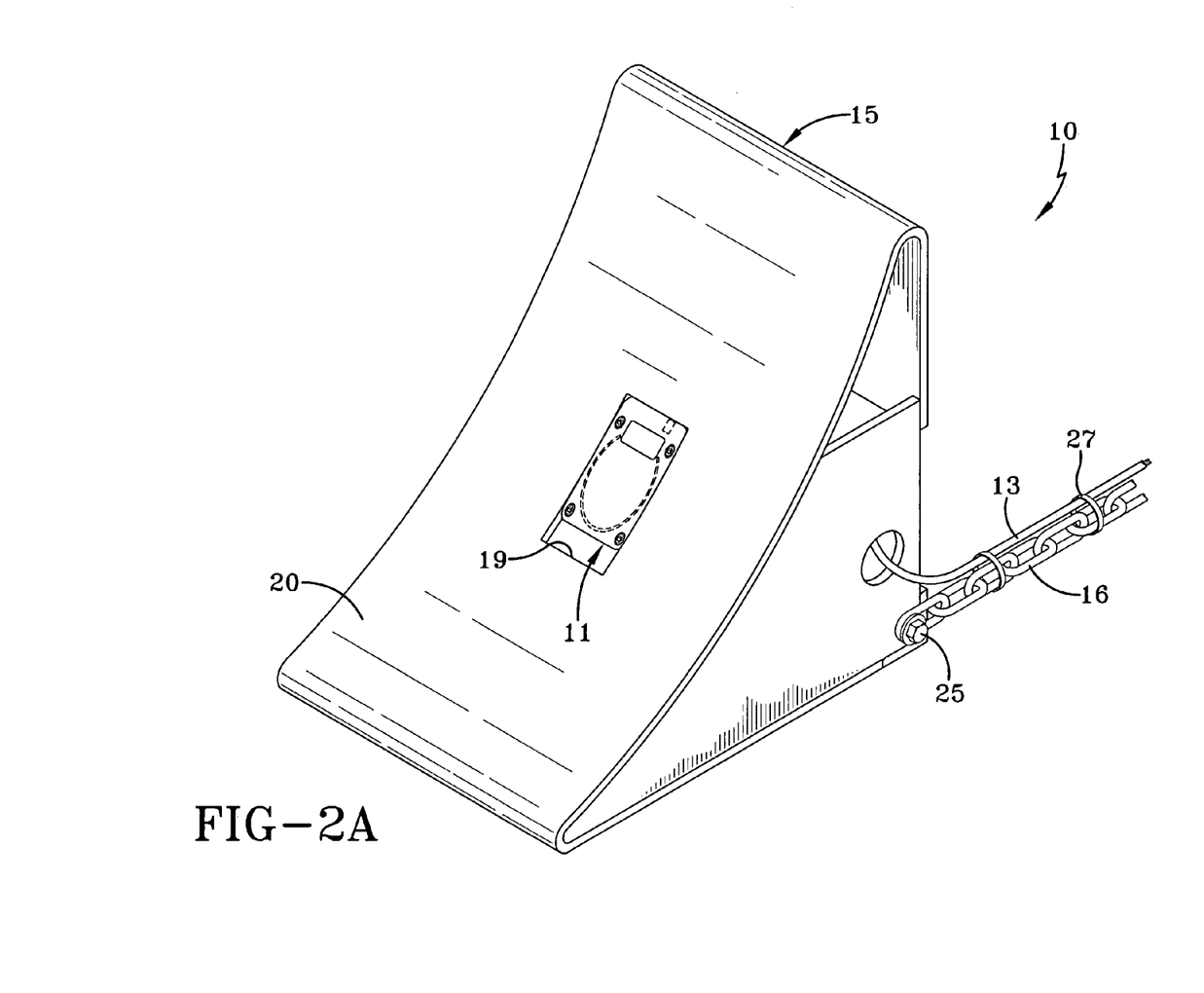
FIG. 2A is a view similar to FIG. 2, but in a non-exploded format and showing the manner in which the sensor is mounted in the wheel chock body.

A first embodiment of a tire-detecting wheel chock apparatus of the present invention useful in solving the above-described problems is indicated generally at 10 and is shown, except for the microcontroller and indicator means of the apparatus described below, in FIGS. 2 and 2A. More particularly, the improved chock apparatus of the present invention utilizes a sensor 11, as best shown in FIGS. 1A-1C, preferably capable of detecting a steel belt 30 of a tire 31 (FIG. 3) mounted on a wheel of a trailer (both not shown). Specifically, sensor 11 is an inductive proximity sensor of the type well-known in the art capable of and having a weld field immune range of about 50 millimeters. More specifically, a weld field immune sensor such as sensor 11 useful in the present invention, is one that emits a magnetic field to enable it to perform its sensing function, but is unaffected by, or immune to, unrelated electromagnetic forces it may encounter, such as a high voltage transformer located adjacent to a loading dock. A preferred inductive proximity sensor is manufactured by IFM effector, located at 805 Springdale Drive, Exton, Pa. 19341, and is particularly useful in the present invention due to its robust weather-resistant design.

Sensor 11 is electrically connected by a cable 13, capable of carrying an electrical signal from the sensor, to a programmable microcontroller 14 (FIGS. 2, 3 and 4), as will be described in greater detail below in the description of the operation of wheel chock apparatus 10.

Figure 4:
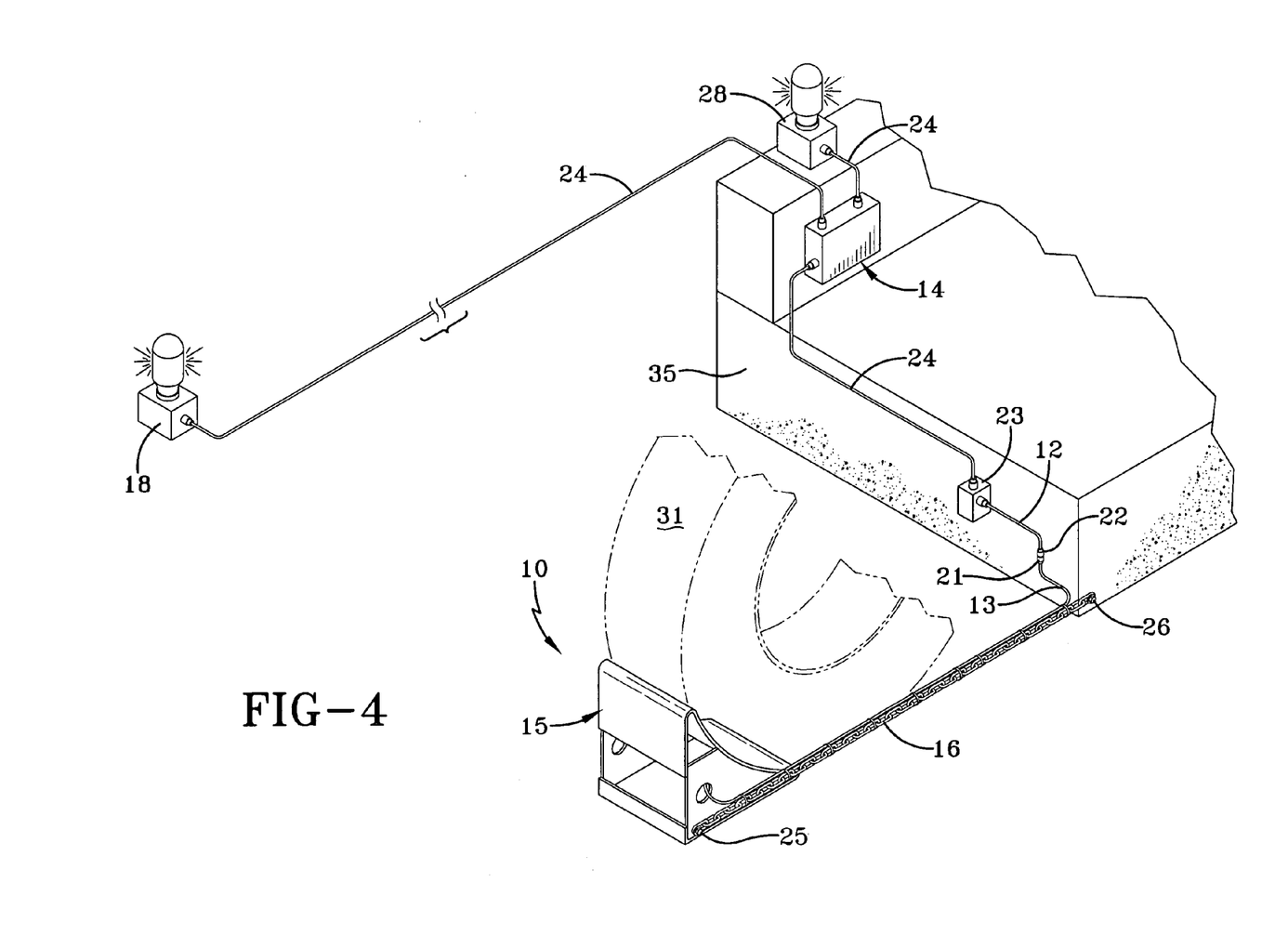
FIG. 4 is a partially diagrammatic fragmentary perspective view similar to FIG. 3, with the tire represented by phantom lines, and showing the manner in which the chock body is electrically connected to a microcontroller and illuminated lights indicating that the tire is properly chocked.

Sensor 11 is mounted on or embedded into a chock body 15, depending on the material used to form the chock body. More specifically, in a chock body 15 of the type shown in FIGS. 2 and 2A, sensor 11 is disposed in an opening 19 formed in a tire contact surface 20 of the chock body, and is welded in place so it is flush with the surface. More specifically, chock body 15 shown in FIGS. 2 and 2A is formed of a heavy metal, such as steel, as is well-known in the chock art, and is sized for application with tires having a certain diameter. A tether chain 16 is attached to the chock at one of the chain ends by a fastener 25, and to a docking bay or loading dock wall 35 by a fastener 26 at the other of the chain ends. This attachment of the ends of chain 16 maintains chock body 15 adjacent to the loading dock to prevent misplacement or theft. Electrical cable 13 is intertwined with a substantial portion of chain 16 by plastic ties 27 or the like for added protection of the cable. The end of cable 13 remote from sensor 11 is formed with a quick-connect plug 21 for making a water-tight electrical connection with a receptacle 22 formed on one end of a dock electrical cable 12 (FIG. 4). The opposite end of dock cable 12 in turn is electrically connected to an electrical box 23 mounted on or adjacent to dock wall 35. A plurality of electrical control cables 24 in turn electrically connect electrical box 23 to microcontroller 14 and a pair of indicator lights 18 and 28. More particularly, indicator light 18 is located outside of the docking bay for ease of viewing by the vehicle operator, and light 28 is located inside the docking bay for ease of viewing by the towmotor operator. Indicators 18, 28 each preferably are capable of producing audible and/or visual signals, such as an alarm or flashing light, respectively, to alert a vehicle or towmotor operator as to whether the vehicle is properly chocked.

Figure 3:
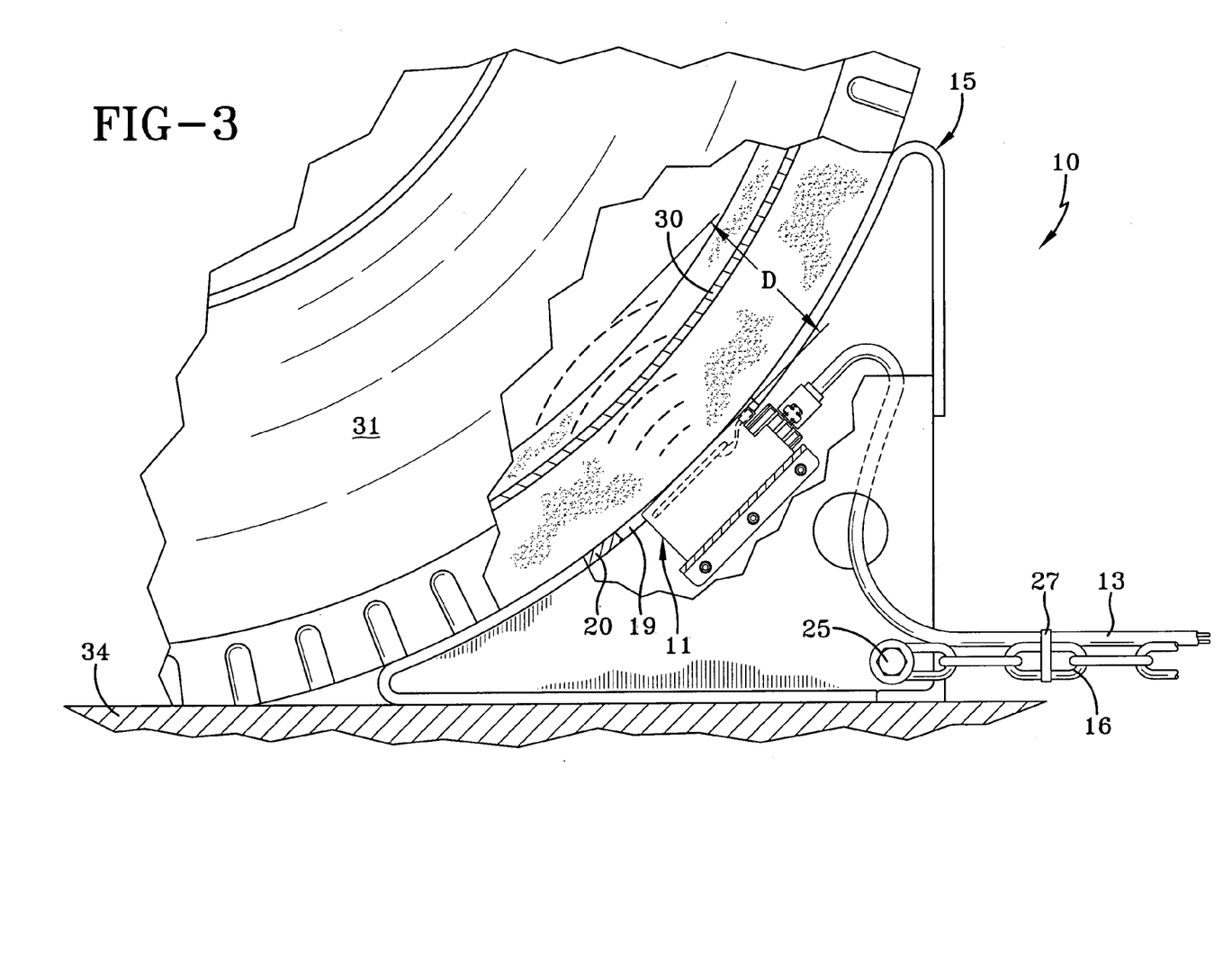
FIG. 3 is a fragmentary side view, with portions broken away, in section, and hidden parts represented by phantom lines, and showing a tire properly chocked by the inventive wheel chock body, and further illustrating a maximum distance that can exist between the chock sensor and the tire for detection to occur.

The operation of tire-detecting wheel chock apparatus 10 of the present invention now will be described. When a driver of a vehicle such as a tractor-trailer backs the trailer against a docking bay or loading dock wall 35, chock body 15 is positioned in front of a selected one of rear tires 31, and preferably one of the rearwardmost tires, as best shown in FIGS. 3 and 4. Another chock body 15 typically is positioned adjacent to the corresponding opposite rear tire (not shown). Tire contact surface 20 of chock body 15, which is sized for use with particular-sized tires, contacts tire 31 so that chock body 15 wedges between the tire and a surface 34 on which the tire is resting. Thus, chock body 15, and its corresponding opposite chock body, are properly positioned to block forward rotation of tire 31 and its wheel, which in turn prevents forward movement of the trailer away from the loading dock.

Sensor 11 is disposed in wheel chock body 15 and flush with surface 20, so that when the chock body is properly positioned against tire 31 as illustrated in FIG. 3, the sensor is less than about 50 millimeters, or a distance D, from tire steel belt 30, thus placing the sensor in range to detect the belt. A signal sensing the presence of steel belt 30 in the 50 millimeter range then is sent via electrical cables 13, 12 and 24 to microcontroller 14, which in turn processes the information and sends a signal to indicators 18, 28. A second chock body and sensor (not shown) chocking the opposite rear tire preferably also is similarly electrically connected to microcontroller 14 and indicators 18, 28. Indicators 18, 28 in turn each produce a signal, such as an audible alarm and/or a visible light signal, that can be seen by the vehicle and towmotor drivers, respectively, so that they know that chock body 15, and preferably its corresponding opposite chock body, are each properly positioned. Thus, the towmotor operator can make an informed judgment as to whether it is advisable to drive onto the trailer, and if not, alert the driver of the vehicle if the driver has not already been alerted by indicator 18, to properly position the chocks without requiring the operator to get off of the towmotor and loading dock and perform a visual inspection.

Figures 5, 6:
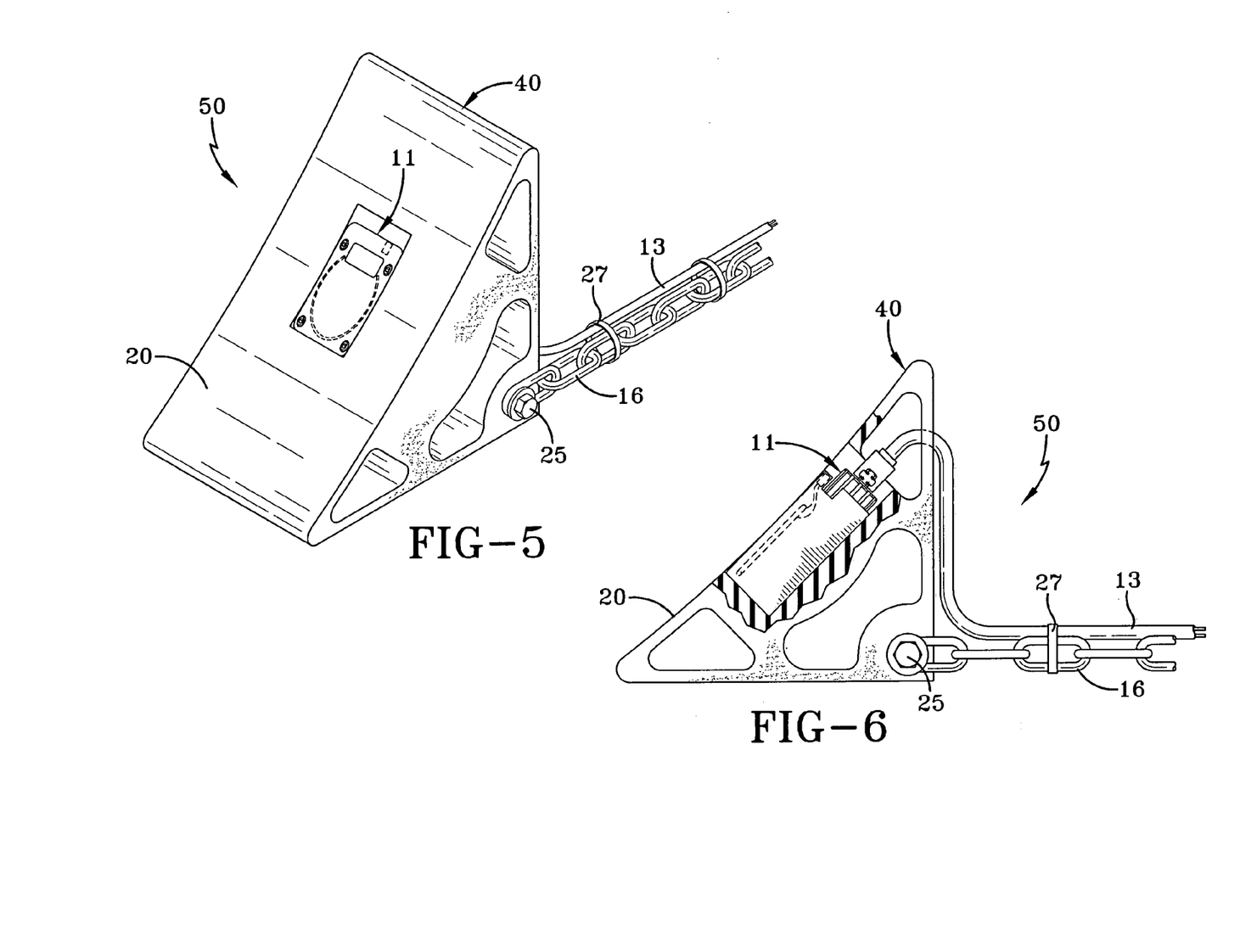
FIG. 5 is a fragmentary perspective view, with hidden portions shown in phantom lines, showing a second embodiment tire-detecting wheel chock apparatus of the present invention.
FIG. 6 is a fragmentary side view of the chock apparatus shown in FIG. 5, with portions broken away, in section, and hidden parts illustrated by phantom lines.

It is understood that the concepts of tire-detecting wheel chock apparatus 10 of the present invention are applicable to nearly every type and varying size of chock body utilized in chocking heavy-duty vehicle tires, including rubber chock body 40 of second embodiment tire-detecting wheel chock apparatus 50 shown in FIGS. 5 and 6. Rubber chock body 40 and apparatus 50 operate generally identically to chock body 15 and apparatus 10, with the only difference being that sensor 11 preferably is embedded in chock body 40 during the rubber molding process.

It also is understood that the present invention contemplates different types of sensors having different types of detecting mechanisms, such as a motion detector with a certain range or a capacitive sensor capable of detecting a body such as the rubber of a tire, and/or detecting structure(s) or component(s) of the vehicle other than the tire, such as a portion of the trailer frame, or the like.

Moreover, it is understood that the present invention further contemplates indicators other than those mentioned hereinabove, such as an LED screen with text. The present invention even contemplates indicator means whereby microcontroller 14 opening a door of the docking bay to enable loading/unloading, only when the vehicle is properly chocked. Moreover, microcontroller 14 can be programmed to indicate improper chocking instead of proper chocking, if desired, or the proper chocking of only one of the pair of chock bodies typically used to chock a vehicle. Also, indicator 18 for the vehicle driver, while preferred, could be eliminated without affecting the overall concept of the invention.

Accordingly, the tire-detecting wheel chock apparatus of the present invention is simplified, provides an effective, safe, inexpensive and efficient apparatus and method which achieve all the enumerated objectives, provide for eliminating difficulties encountered with prior chocks, and solve problems and obtain new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the tire-detecting wheel chock apparatus is used and installed, the characteristics of the construction and arrangement, and the advantageous, new and useful results obtained; the new and useful structures, devices, elements, arrangements, parts, processes and combinations are set forth in the appended claims.

What is claimed is:

1. At a docking bay for loading and unloading a heavy-duty vehicle, an apparatus for chocking at least one tire of said vehicle to prevent motion of the vehicle away from said docking bay during said loading and unloading, said apparatus including:
   a) chock means for wedging between said tire and a surface on which the tire is resting, to block motion of said tire and a wheel on which the tire is mounted away from said docking bay;
   b) sensor means mounted on said chock means far detecting a predetermined selected component of said vehicle, said sensor means selected from the group consisting of an inductive proximity sensor and a capacitive proximity sensor;
   c) a programmable microcontroller, said microcontroller being electrically connected to said sensor means; and d) indicator means electrically connected to said microcontroller for indicating a condition selected from the group consisting of, a properly positioned chock means and an improperly positioned chock means, whereby said sensor means detects a steel belt of said tire being chocked, so that at least an individual performing said loading and unloading is alerted to said condition by said indicator means.

2. The apparatus of claim 1, in which said sensor means is an inductive proximity sensor.

3. The apparatus of claim 1, in which said indicator means is at least one light visible to said individual performing said loading and unloading.

4. The apparatus of claim 1, in which said indicator means indicates said selected condition by an alert selected from the group consisting of, a visual alert, an audible alert, and opening or closing a door of said docking bay to allow or prevent, respectively, said loading or unloading to occur.

5. The apparatus of claim 4, in which said indicator means alerts a driver of said vehicle of said selected condition.

6. The apparatus of claim 1, in which an electrical cable electrically connects said sensor means to said microcontroller; and in which a substantial portion of said electrical cable is intertwined with a tether chain attached at one of its ends to said chock means and at the other of its ends to said docking bay.

7. The apparatus of claim 1, in which a pair of chock means prevents forward motion of said vehicle; in which each one of a pair of said sensor means is mounted on respective ones of said pair of chock means; and in which each one of said sensor means is electrically connected to said microcontroller.

8. At a docking bay for loading and unloading a heavy-duty vehicle, an apparatus for chocking at least one tire of said vehicle to prevent motion of the vehicle away from said docking bay during said loading and unloading, said apparatus including:
  a) chock means for wedging between said tire and a surface on which the tire is resting, to block motion of said tire and a wheel on which the tire is mounted away from said docking bay;
  b) an inductive proximity sensor mounted on said chock means for detecting a steel belt of said tire being chocked, said inductive proximity sensor having a weld field immune range of about 50 millimeters;
  c) a programmable microcontroller; said microcontroller being electrically connected to said inductive proximity sensor; and
  d) indicator means electrically connected to said microcontroller fox indicating a condition selected from the group consisting of, a properly positioned chock means and an improperly positioned chock means, so that at least an individual performing said loading and unloading is alerted to said condition.

* * * * *

UNITED STATES PATENT AND TRADEMARK OFFICE
CERTIFICATE OF CORRECTION

| | | |
|---|---|---|
| PATENT NO. | : 7,226,265 B2 | Page 1 of 1 |
| APPLICATION NO. | : 10/798708 | |
| DATED | : June 5, 2007 | |
| INVENTOR(S) | : James D. Wilson | |

It is certified that error appears in the above-identified patent and that said Letters Patent is hereby corrected as shown below:

IN THE CLAIMS:

Amend Column 8, line 22, by deleting "fox" and substituting therefor --for--.

Signed and Sealed this

Fourteenth Day of August, 2007

JON W. DUDAS
*Director of the United States Patent and Trademark Office*